US008496176B2

(12) United States Patent
Hall, Jr. et al.

(10) Patent No.: US 8,496,176 B2
(45) Date of Patent: Jul. 30, 2013

(54) SCANNING APPARATUS AND METHOD FOR ENTERING A USER INPUT INTO THE APPARATUS USING A NON-ELECTRICAL CONTROL DEVICE

(75) Inventors: James A. Hall, Jr., Boise, ID (US); Douglas G. Keithley, Boise, ID (US)

(73) Assignee: Marvell International Technology Ltd. (BM)

( * ) Notice: Subject to any disclaimer, the term of this patent is extended or adjusted under 35 U.S.C. 154(b) by 234 days.

(21) Appl. No.: 12/871,681

(22) Filed: Aug. 30, 2010

(65) Prior Publication Data

US 2010/0321734 A1    Dec. 23, 2010

Related U.S. Application Data

(63) Continuation of application No. 11/400,082, filed on Apr. 7, 2006, now Pat. No. 7,798,407.

(51) Int. Cl.
*G06K 7/10* (2006.01)

(52) U.S. Cl.
USPC .......................................................... 235/454

(58) Field of Classification Search
USPC ........................... 235/454; 358/406, 474, 497
See application file for complete search history.

(56) References Cited

U.S. PATENT DOCUMENTS

| | | | |
|---|---|---|---|
| 6,154,293 | A | 11/2000 | Chieh |
| 6,327,047 | B1 * | 12/2001 | Motamed ..................... 358/1.15 |
| 6,369,833 | B1 | 4/2002 | van Liempd et al. |
| 6,388,778 | B1 | 5/2002 | Ko-Chien |
| 6,816,154 | B2 | 11/2004 | Wong et al. |
| 7,031,028 | B2 * | 4/2006 | Liu et al. ........................ 358/406 |
| 7,156,307 | B2 | 1/2007 | Stadelmann et al. |
| 7,212,312 | B2 | 5/2007 | Motamed |
| 7,405,847 | B2 | 7/2008 | Short et al. |
| 7,525,699 | B2 * | 4/2009 | Mai et al. ....................... 358/474 |
| 2004/0109192 | A1 * | 6/2004 | Nuttall et al. ................. 358/1.14 |
| 2007/0235541 | A1 | 10/2007 | Hall, Jr. et al. |

* cited by examiner

*Primary Examiner* — Ahshik Kim

(57) ABSTRACT

A scanning apparatus and method for entering a user input into the apparatus uses a non-electrical control device having a target undersurface, which can be manually manipulated to a particular setting. The particular setting of the non-electrical control device is determined by processing an image of at least a portion of the target undersurface captured by a scan sensor of the scanning apparatus.

20 Claims, 8 Drawing Sheets

SCANNING APPARATUS AND METHOD FOR ENTERING A USER INPUT INTO THE APPARATUS USING A NON-ELECTRICAL CONTROL DEVICE

This application is a continuation application of U.S. patent application Ser. No. 11/400,082, filed Apr. 7, 2006, which is hereby incorporated by reference in its entirety.

BACKGROUND OF THE INVENTION

Conventional scanning apparatuses typically include a user interface in the form of a control panel with a number of electrical control devices and a small display device so that users can enter commands into the apparatuses. As an example, a combined scan, copy and print device or an "All In One" (AIO) device typically includes a small number of electrical buttons and a small LCD display device. The electrical buttons are used for entering commands, such as "set number of copies", "adjust contrast", "start", "clear," etc. The results of these commands are displayed on the LCD display device. Since LCD display devices can be expensive, cost sensitive products usually include small, ambient-lit, character LCD display devices.

A concern with these conventional scanning apparatuses is that the electrical control devices and the display devices add significant cost to each scanning apparatus. For low cost AIO devices, the inclusion of electrical buttons and display devices translates into several dollars of material and manufacturing overhead to the cost of the AIO devices.

Another concern with these conventional scanning apparatuses is that the small size of the LCD display devices limits the amount of characters that can be displayed. As an example, a small LCD display device may be limited to twenty characters on two lines. Thus, in this example, a user may have to navigate through a complex maze of menus to find the desired selection.

Another concern with these conventional scanning apparatuses is that the electrical control devices and the display devices may prematurely malfunction. Thus, the electrical control devices and the display devices may increase the possibility of untimely product failure.

In view of these concerns, what is needed is a scanning apparatus and method for entering user inputs into the apparatus without the use of electrical control devices and/or a display device, which can reduce the overall cost of the apparatus and decrease the possibility of untimely product failure.

SUMMARY OF THE INVENTION

A scanning apparatus and method for entering a user input into the apparatus uses a non-electrical control device having a target undersurface, which can be manually manipulated to a particular setting. The particular setting of the non-electrical control device is determined by processing an image of at least a portion of the target undersurface captured by a scan sensor of the scanning apparatus. The non-electrical control device can replace a conventional electrical control device, which may reduce the overall cost of the scanning apparatus, decrease the possibility of untimely product failure and even eliminate the need for an electronic display device.

A scanning apparatus in accordance with an embodiment of the invention comprises a non-electrical control device, a scan sensor and a controller. The non-electrical control device has a target undersurface and is configured to displace the target undersurface in response to manual manipulation of the non-electrical control device to a particular setting. The scan sensor is positioned relative to the non-electrical control device to electronically capture an image of at least a portion of the target undersurface of the non-electrical device. The controller is configured to receive and process the image to determine the particular setting of the non-electrical control device.

A scanning apparatus in accordance with another embodiment of the invention comprises a housing structure, a non-electrical control device, a scan sensor, a drive mechanism and a controller. The housing structure includes a scanning region and a user interface region. The non-electrical control device has a target undersurface and is positioned in the user interface region. The non-electrical control device is configured to displace the target undersurface in response to manual manipulation of the non-electrical control device to a particular setting. The scan sensor is located in the housing structure. The drive mechanism is configured to move the scan sensor across the scanning region and the user interface region. The controller is configured to control the scan sensor and the drive mechanism. The controller is further configured to process an image of at least a portion of the target undersurface of the non-electrical control device captured by the scan sensor when the scan sensor is positioned below the user interface region to determine the particular setting of the non-electrical control device.

A method for entering a user input into a scanning apparatus in accordance with an embodiment of the invention comprises displacing a target undersurface of a non-electrical control device of the scanning apparatus in response to manual manipulation of the non-electrical control device to a particular setting, electronically imaging the non-electrical control device to capture an image of at least a portion of the target undersurface of the non-electrical control device, and processing the image to determine the particular setting of the non-electrical control device.

Other aspects and advantages of the present invention will become apparent from the following detailed description, taken in conjunction with the accompanying drawings, illustrated by way of example of the principles of the invention.

DETAILED DESCRIPTION

Figure 1:
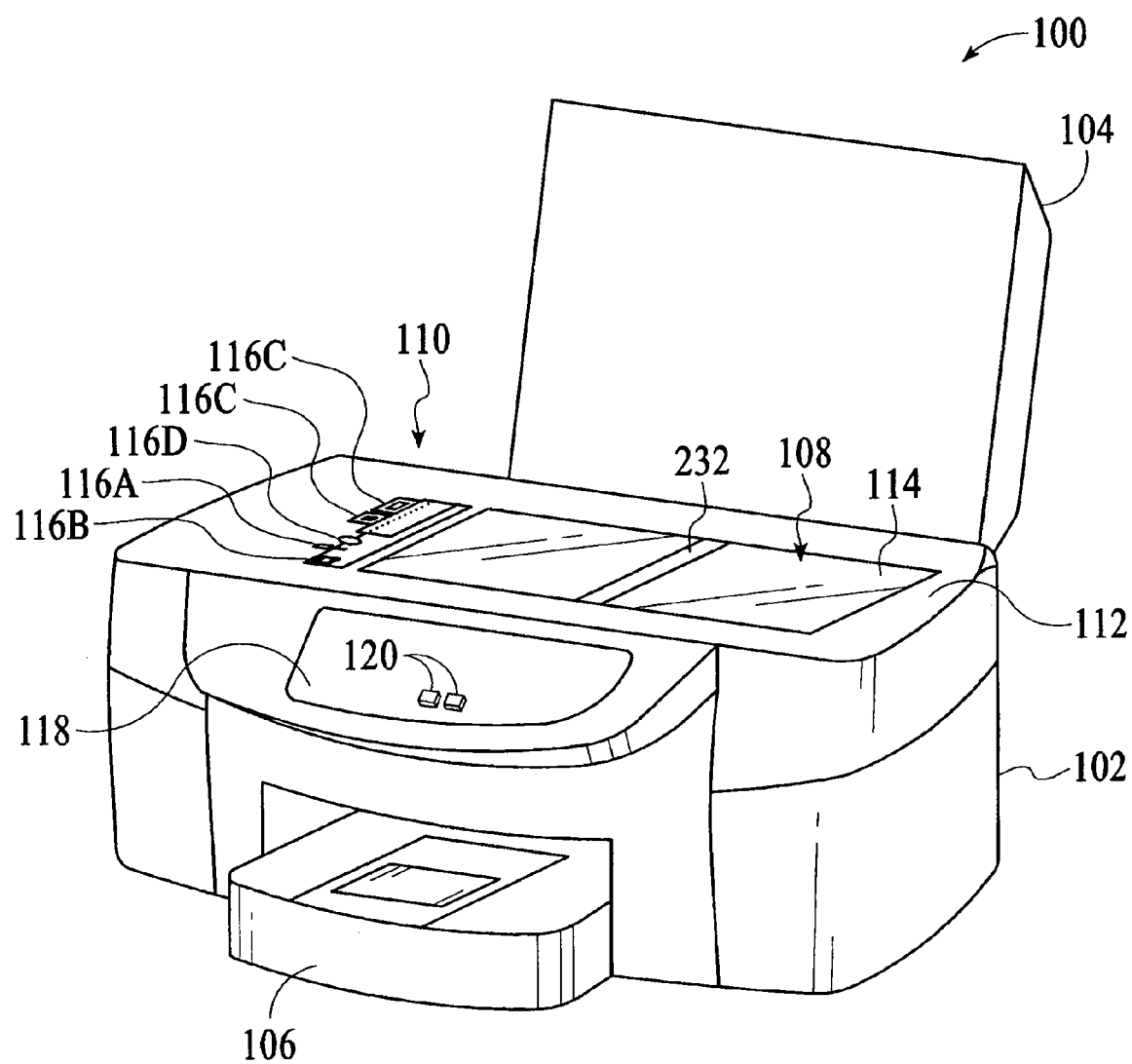
FIG. 1 is a perspective view of a scanning apparatus in accordance an embodiment of the invention.

With reference to FIG. 1, a scanning apparatus 100 in accordance with an embodiment of the invention is described. The scanning apparatus 100 is illustrated in FIG. 1 as being a combined scan, copy and print device or an "All In One" (AIO) device. However, in other embodiments, the scanning apparatus 100 can be any scanning apparatus, such as a flatbed scanner. As shown in FIG. 1, the AIO device 100 includes a housing structure 102, a scanner lid 104 and a supply 106 of print media. The housing structure 102 is configured to include a scanning region 108 and a user interface region 110, which are located at the upper surface 112 of the housing structure. In an embodiment, the scanning region 108 and the user interface region 110 are provided by a single transparent panel 114 such as a single glass panel, which is attached to the upper surface 112 of the housing structure 102. In other embodiments, the scanning region 108 and the user interface region 110 may be provided by multiple transparent panels, such as multiple glass panels.

As illustrated in FIG. 1, the AIO device 100 includes one or more non-electrical control devices 116, which are located in the user interface region 110. As described in more detail below, the settings of the non-electrical control devices 116 are optically determined by imaging at least a portion of each non-electrical control device using the scanning capabilities of the AIO device 100. These non-electrical control devices 116 can replace electrical control devices and an LCD display device that are commonly found in a conventional scanning apparatus. In contrast to electrical control devices, the non-electrical control devices 116 do not include any electronic components, and consequently, can be significantly lower in price than the electrical control devices. Thus, the non-electrical control devices 116 can significantly reduce the overall cost of the AIO device 100. In addition, since the non-electrical control devices 116 do not include any electronic components, these non-electrical control devices are less susceptible to malfunction, which can decrease the possibility of untimely product failure. Furthermore, the AIO device 100 is designed so that the current settings of the non-electrical control devices 116 are readily visible to the user, which eliminates the need for an electronic display device to display graphical information regarding the settings of the devices.

The AIO device 100 may also include an optional control panel 118 with one or more conventional electrical control devices 120. The control panel 118 is attached to the housing structure 102, as shown in FIG. 1. In the illustrated embodiment, the optional control panel 118 includes two electrical buttons 120. However, in other embodiments, the control panel 118 may include any number of conventional electrical control devices, such as buttons, dials, levers and knobs.

Figure 2:
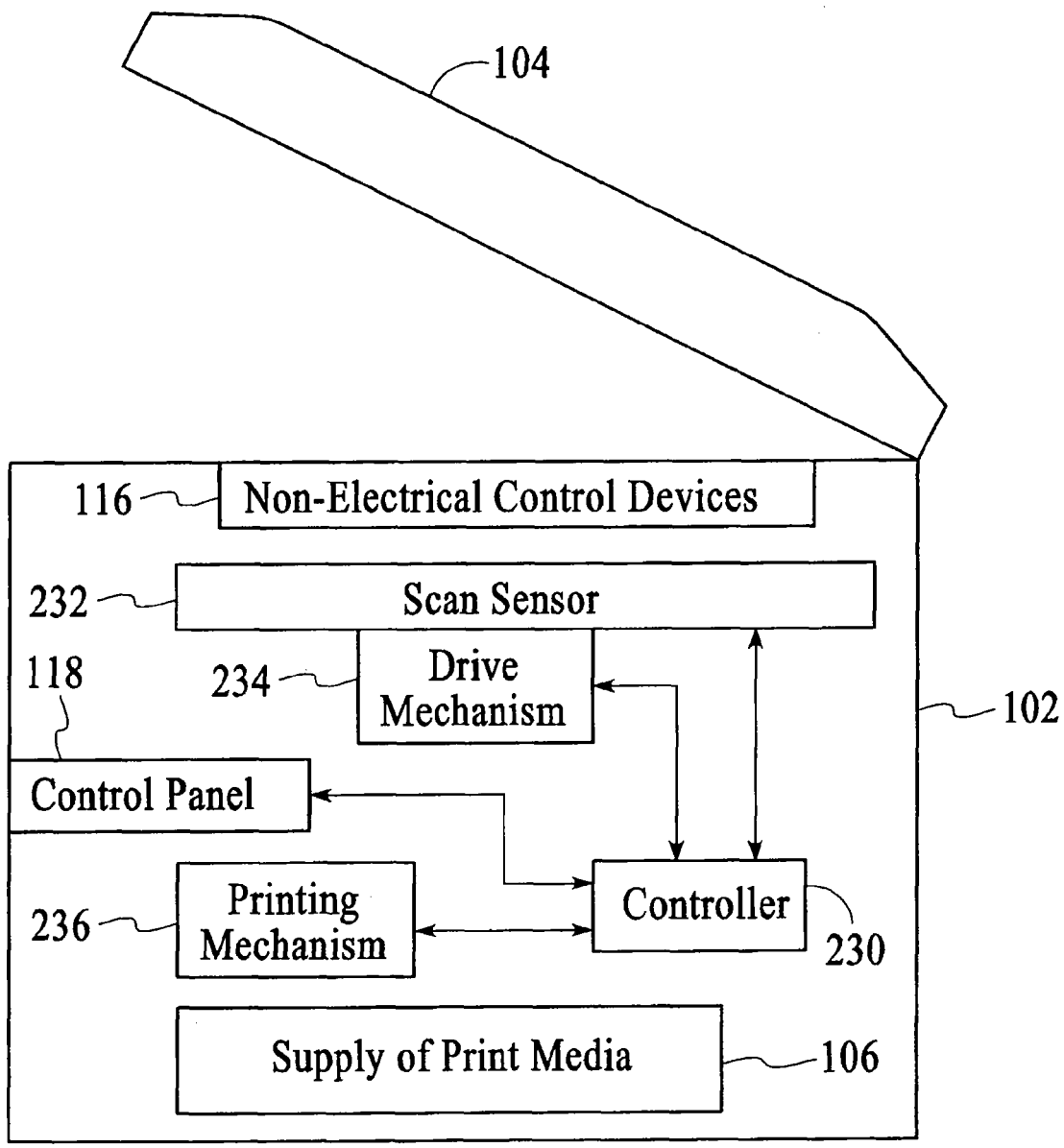
FIG. 2 is a block diagram of the components included in the scanning apparatus of FIG. 1 in accordance an embodiment of the invention.

Turning now to FIG. 2, a block diagram of the AIO device 100 is shown. The housing structure 102 of the AIO device 100 houses the internal components of the AIO device. These internal components include a controller 230, a scan sensor 232, a drive mechanism 234, a printing mechanism 236 and the supply 106 of print media. The controller 230 is configured to transmit, receive and process signals from various components of the AIO device 100 to control the functions of the AIO device. As described in more detail below, the controller 230 also determines the current settings of the non-electrical control devices 116 by processing captured images of the non-electrical control device. The controller 230 can be implemented as one or more digital signal processors.

Figure 3:
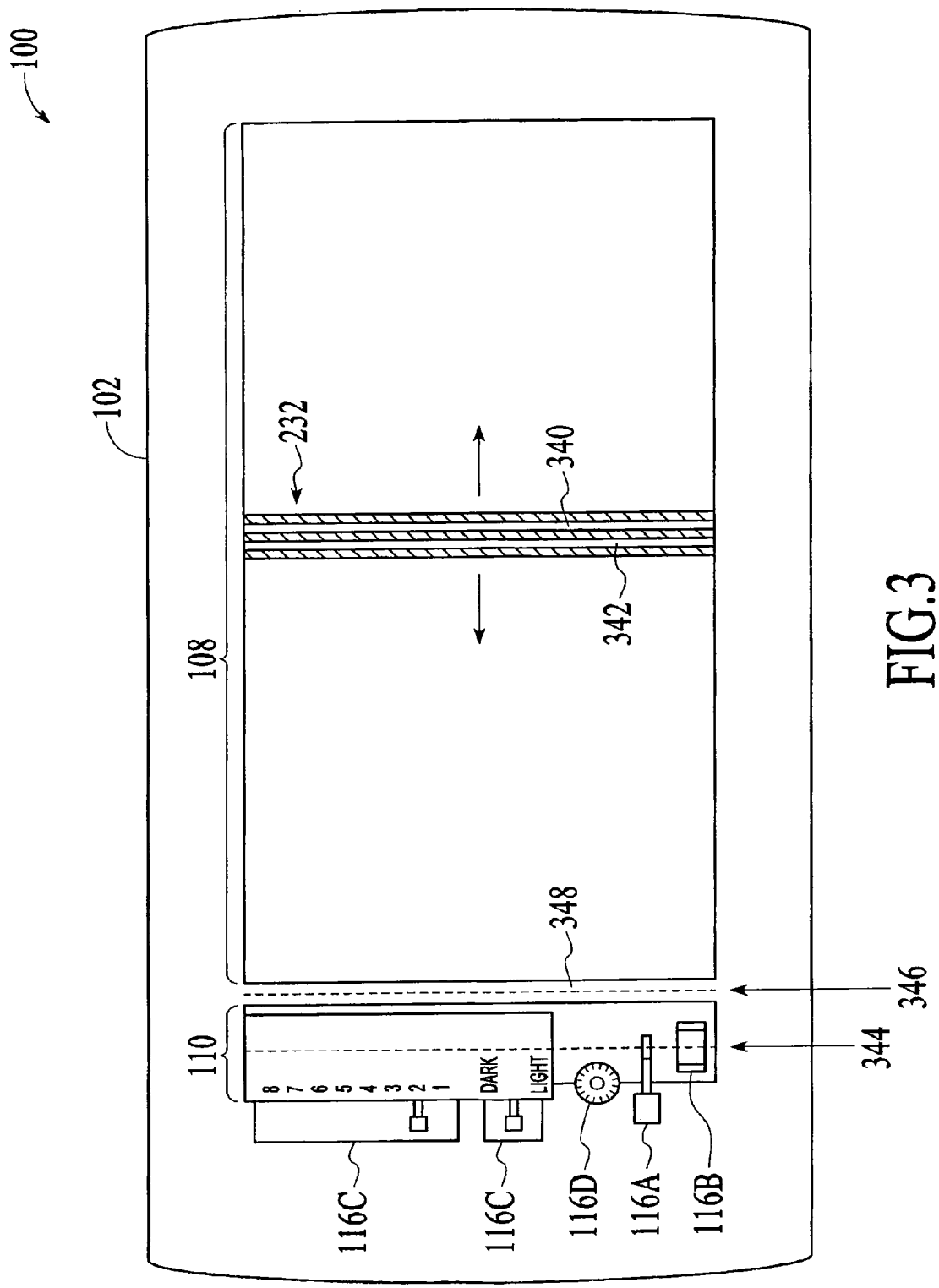
FIG. 3 is top view of the scanning apparatus of FIG. 1 without a scanner lid.

The scan sensor 232 is configured to electronically capture an image of a target above the scan sensor. As shown in FIG. 1, the scan sensor 232 is positioned in the housing structure 102 below the transparent glass panel 114. The scan sensor 232 is illustrated in more detail in FIG. 3, which is a top view of the AIO device 100 without the scanner lid 104. As shown in FIG. 3, the scan sensor 232 includes a light source 340 and a linear image sensor array 342. In operation, the light source 340 provides linear illumination on a target above the scan sensor 232, while the linear image sensor array 342 electronically captures a linear image of the target. Since the image sensor array 342 is linear, the image sensor array captures the image along a scan line, which is parallel to the image sensor array 342. Thus, the current scan line of the scan sensor 232 is dependent on the position of the scan sensor. The light source 340 may be a fluorescent lamp, such as a cold cathode fluorescent lamp (CCFL) or a xeon lamp, an array of red (R), green (G) and blue (B) light emitting diodes (LEDs), or any suitable light source. The image sensor array 342 may be a charged coupled device (CCD) array, a contact image sensor (CIS) array or any other type of an image sensor array. The scan sensor 232 includes other well know components that are commonly found in a conventional scan sensor. However, these components are neither shown nor described herein so that the inventive features of the AIO device 100 are not obscured.

The scan sensor 232 is connected to the drive mechanism 234, which operates to linearly move the scan sensor in a direction perpendicular to the length of the scan sensor across the scanning region 108 and the user interface region 110 of the AIO device 100, as shown in FIG. 3. The drive mechanism 234 can move the scan sensor 232 so that the scan line of the scan sensor is aligned with a control scan line 344, which is located in the user interface region 110. The control scan line 344 is used to capture images of the non-electrical control devices 116 to determine the current settings of the non-electrical control devices. The drive mechanism 234 can also move the scan sensor 232 so that the scan line of the scan sensor is aligned with a calibration scan line 346, which is located between the scanning region 108 and the user interface region 110. The calibration scan line 346 is used to image a calibration strip 348 to calibrate the scan sensor 232 for imaging operations. The drive mechanism 234 can also move the scan sensor 232 so that the scan line of the scan sensor is linearly moved across the scanning region 108. Thus, the scan sensor 232 can image an entire target object placed in the scanning region 108. The scan sensor 232 operates to capture images of a target object placed in the scanning region 108 or the non-electrical control devices 116 in the user interface region 110 in the form of image data and transmit the image data to the controller 230, where the image data is processed to produce a complete digital image of the target object or to determine the current settings of the non-electrical control devices 116.

The printing mechanism 236 is configured to print the complete digital image of the target object captured by the scan sensor 232 onto a print medium, e.g., a sheet of paper, from the supply 106 of print media. The printing mechanism 236 can also print an electronic file, such as an electronic document or a digital image file, from a computer (not shown) connected to the AIO device 100. The printing mechanism 236 may use inkjet or laser technology for depositing ink or toner onto print media. The printing mechanism 236 is a common component found in conventional AIO devices, and thus, is not described herein in detail.

The non-electrical control devices 116 in the user interface region 110 of the AIO device 100 may include any combination of non-electrical buttons, non-electrical switches, non-electrical sliding selectors and non-electrical rotary dials. As an example, the user interface region 110 may include a non-electrical button 116A, a non-electrical switch 116B, two non-electrical sliding selectors 116C and a non-electrical rotary dial 116D, as shown in FIG. 3. In this example, the button 116A and the switch 116B are used to activate the scan and copy processes, respectively. Moreover, one of the sliding selectors 116C is used to set the number of copies, while the other sliding selector 116C is used to set the contrast. The rotary dial 116D is used to set the scaling option. These different types of non-electrical control devices 116 in accordance with embodiments of the invention are described in detail below.

Figure 4A:
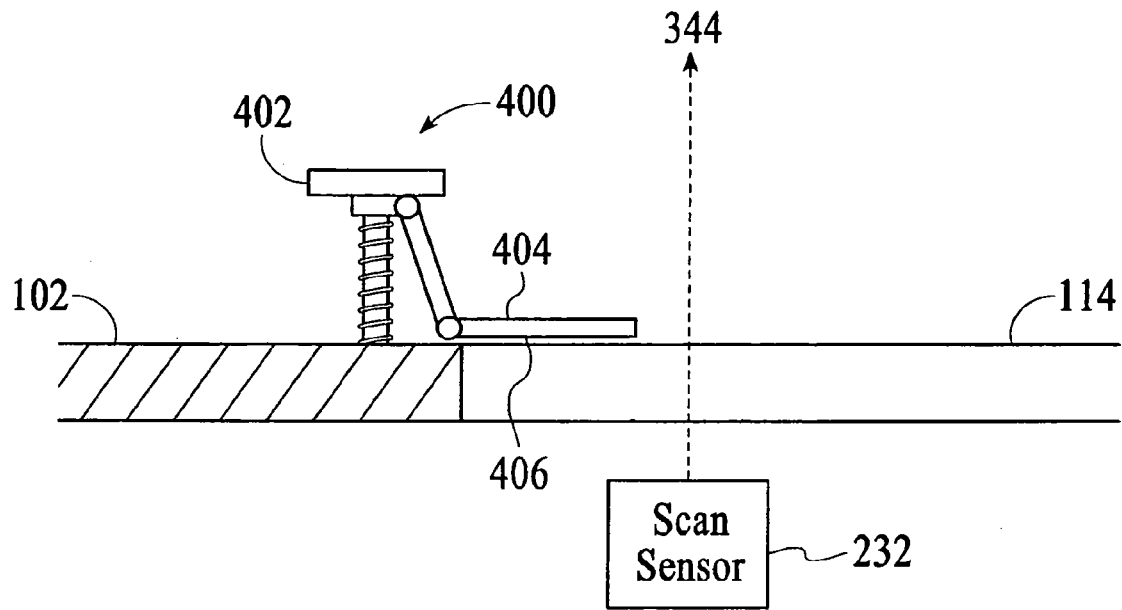
FIGS. 4A and 4B are cross-sectional side views of a non-electrical button in accordance with an embodiment of the invention.
Figure 4B:
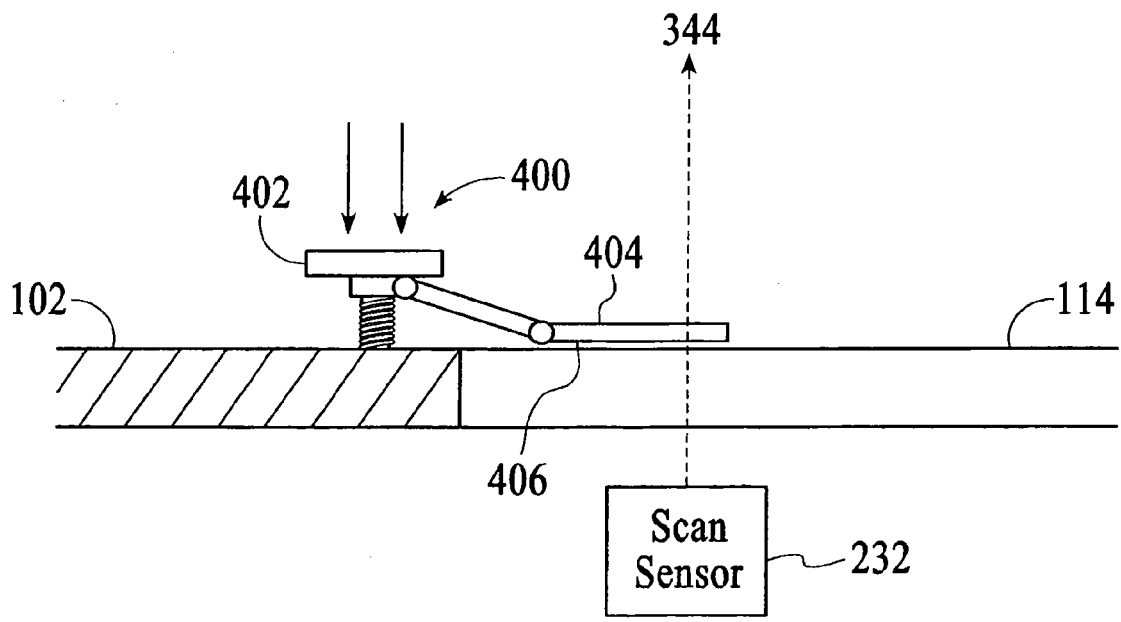

Turning now to FIGS. 4A and 4B, a cross-sectional side view of a non-electrical button 400 in accordance with an embodiment of the invention is shown. The button 400 includes a main mechanical structure 402 that can be manually manipulated between two settings. The main mechanical structure 402 can be released into a first setting, as shown in FIG. 4A, or can be depressed into a second setting, as shown in FIG. 4B. The first setting of the main mechanical structure 402 may indicate that the button 400 is deactivated, while the second setting of the main mechanical structure may indicate that the button is activated. However, these designations can be reversed. As an example, the mechanical structure 402 of the button 400 may use a spring and a locking mechanism to facilitate these two settings. The button 400 further includes an extendable member 404, which is attached to the main mechanical structure 402 so that the extendable member is raised and lowered as the main mechanical structure is pressed down or released. The extendable member 404 has an undersurface 406, which can be imaged to determine the current setting of the button 400.

As shown in FIG. 4A, when the main mechanical structure 402 is released to the first setting, the extendable member 404 is raised and retracted such that the extendable member is not over the control scan line 344. However, as shown in FIG. 4B, when the main mechanical structure 402 is depressed to the second setting, the extendable member 404 is lowered onto the transparent glass panel 114 and extended over the control scan line 344. Thus, the current setting of the button 400 can be determined by activating the scan sensor 232 to capture an image along the control scan line 344, which is transmitted to and processed by the controller 230 to determine whether the undersurface 406 of the extendable member 404 of the button 400 has been imaged or not. If the undersurface 406 of the extendable member 404 is not detected in the captured image, then it is determined that the button 400 is currently in the first setting, e.g., it is deactivated. However, if the undersurface 406 of the extendable member 404 is detected in the captured image, then it is determined that the button 400 is currently in the second setting, e.g., it is activated.

Figure 5A:
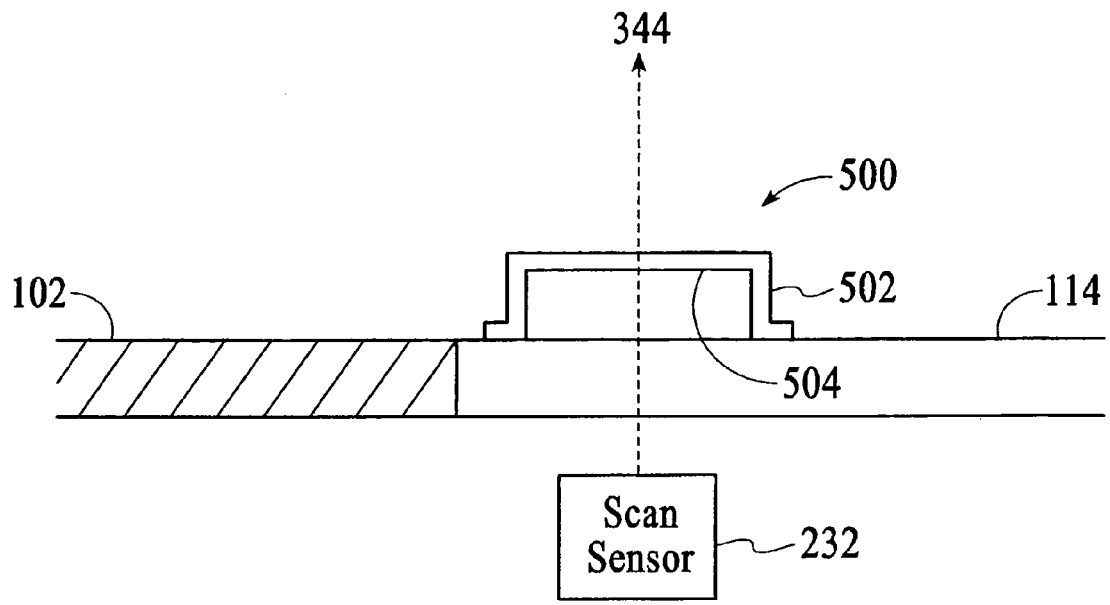
FIGS. 5A and B are cross-sectional side views of a non-electrical dome-type switch in accordance with an embodiment of the invention.
Figure 5B:
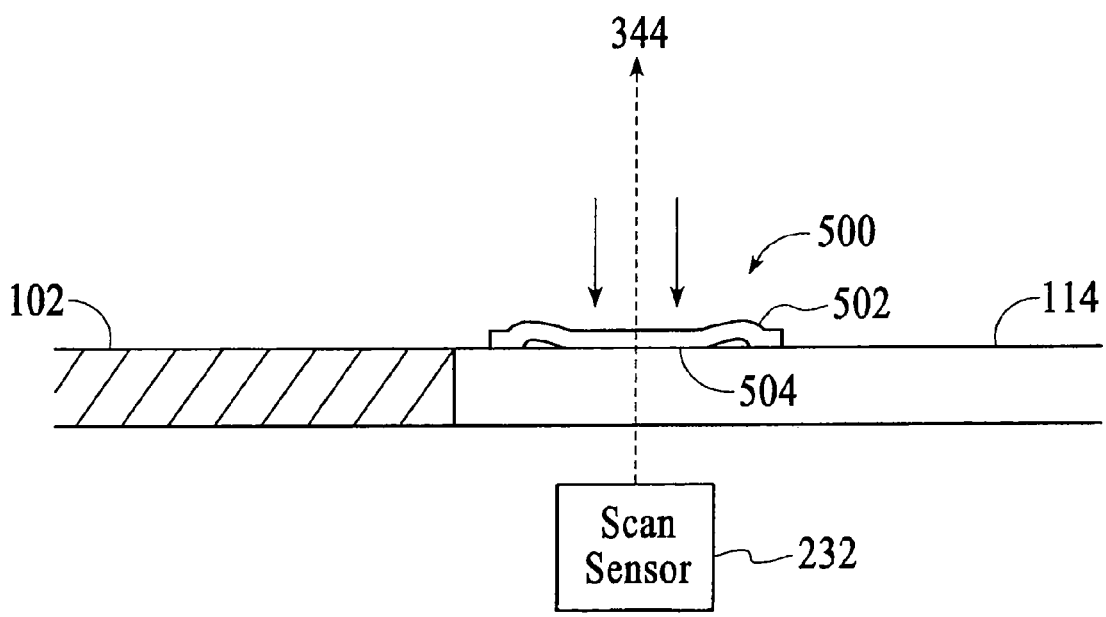

Turning now to FIGS. 5A and 5B, a cross-sectional side view of a non-electrical dome-type switch 500 in accordance with an embodiment of the invention is shown. The switch 500 includes a dome structure 502 made of an elastic material, such as rubber. The switch 500 includes a target undersurface 504, which can be imaged to determine the current setting of the switch 500. The target undersurface 504 is located below the central region of the dome structure 502. In an embodiment, the target undersurface 504 may include a pattern, which may be printed or molded onto the underside of the dome structure 502. The target undersurface 504 of the switch 500 is positioned over the control scan line 344. The switch 500 can be released into a first setting, as shown in FIG. 5A, or can be depressed into a second setting, as shown in FIG. 5B. The first setting of the switch 500 may indicate that the switch is deactivated, while the second setting of the switch may indicate that the switch is activated. However, these designations can be reversed.

As shown in FIG. 5A, when the non-electrical switch 500 is not depressed, the target undersurface 504 of the switch is positioned at some distance from the transparent glass panel 114, and thus, from the scan sensor 232. However, as shown in FIG. 5B, when the switch 500 is depressed, the target undersurface 504 of the switch is moved closer to the transparent glass panel 114, and thus, closer to the scan sensor 232. Since the scan sensor 232 typically has a very poor depth-of-field, the scan sensor can only image the target undersurface 504 of the non-electrical switch 500 when the target undersurface is moved close to the transparent glass panel 114, and consequently, closer to the scan sensor. Thus, the current setting of the switch 500 can be determined by activating the scan sensor 232 to capture an image along the control scan line 344, which is transmitted to and processed by the controller 230 to determine whether the target undersurface 504 of the switch has been imaged or not. If the undersurface 504 of the switch 500 is not detected in the captured image, then it is determined that the switch 500 is currently in the first setting, e.g., it is deactivated. However, if the undersurface 504 of the switch 500 is detected in the captured image, then it is determined that the switch is currently in the second setting, e.g., it is activated.

Figure 6A:
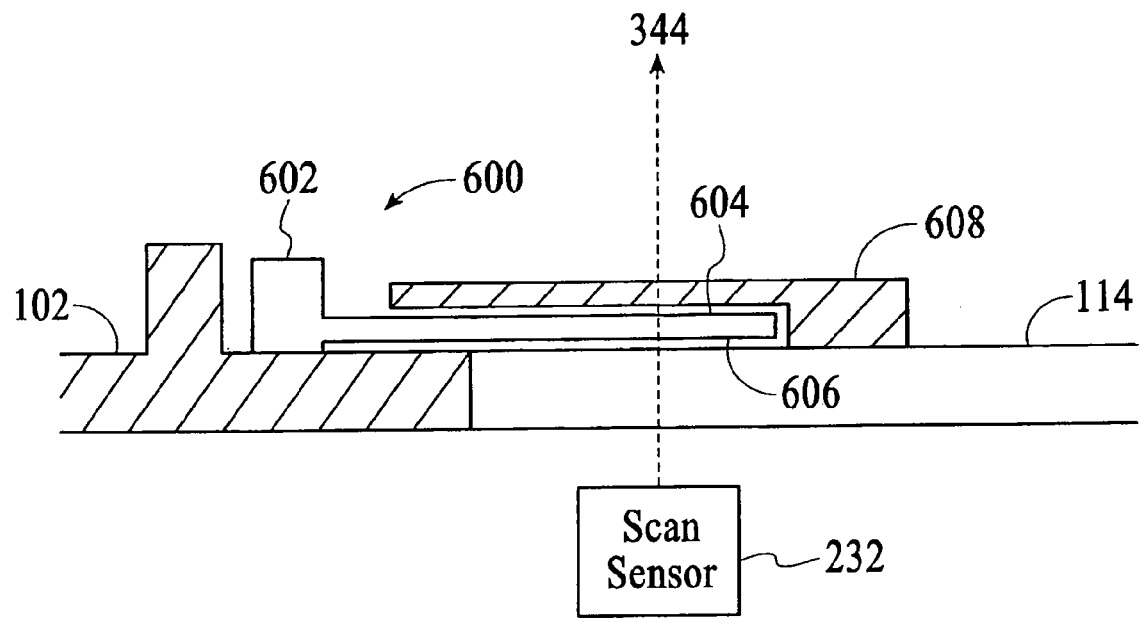
FIG. 6A is a cross-sectional side view of a non-electrical sliding selector in accordance with an embodiment of the invention.
Figure 6B:
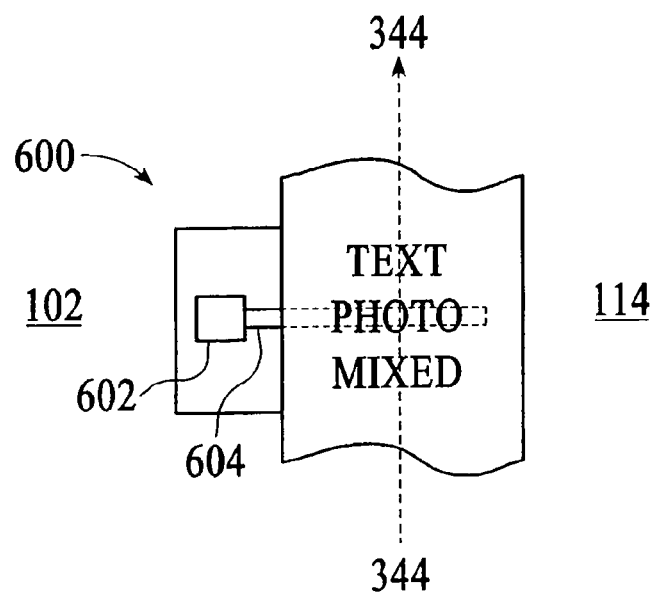
FIG. 6B is a top view of the non-electrical sliding selector of FIG. 6A.

Turning now to FIGS. 6A and 6B, a non-electrical sliding selector 600 in accordance with an embodiment of the invention is shown. FIG. 6A is a cross-sectional side view of the sliding selector 600, while FIG. 6B is a top view of the sliding selector 600. The sliding selector 600 includes a slider 602 having a sliding arm 604. The sliding arm 604 of the slider 602 includes a target undersurface 606, which can be imaged to determine the current setting or selection of the sliding selector 600. As shown in FIG. 6A, the sliding arm 604 of the slider 602 is positioned over the control scan line 344. The sliding arm 604 is also positioned between the transparent glass panel 114 and a setting indicator panel 608, which includes markings indicating the different selections or settings for the sliding selector 600. As shown in FIG. 6B, the slider 602 can be laterally moved so that the sliding arm 604 is aligned with one of the selections, which include "TEXT", "PHOTO" and "MIXED". In FIG. 6B, the sliding arm 604 of the slider 602 is currently aligned with the setting or selection of "TEXT". The sliding selector 600 may include detents (not shown) so that a user can feel the different selections.

When the slider 602 is laterally moved to one of the selections, the sliding arm 604 is positioned at a particular location. Thus, the current setting or selection of the sliding selector 600 can be determined by activating the scan sensor 232 to capture an image of a portion of the undersurface 606 of the sliding arm 604 along the control scan line 344, which is transmitted to and processed by the controller 230 to determine the current position of the sliding arm. The position of the sliding arm 604 is then used to determine the current selection or setting of the sliding selector 600.

Figure 7A:
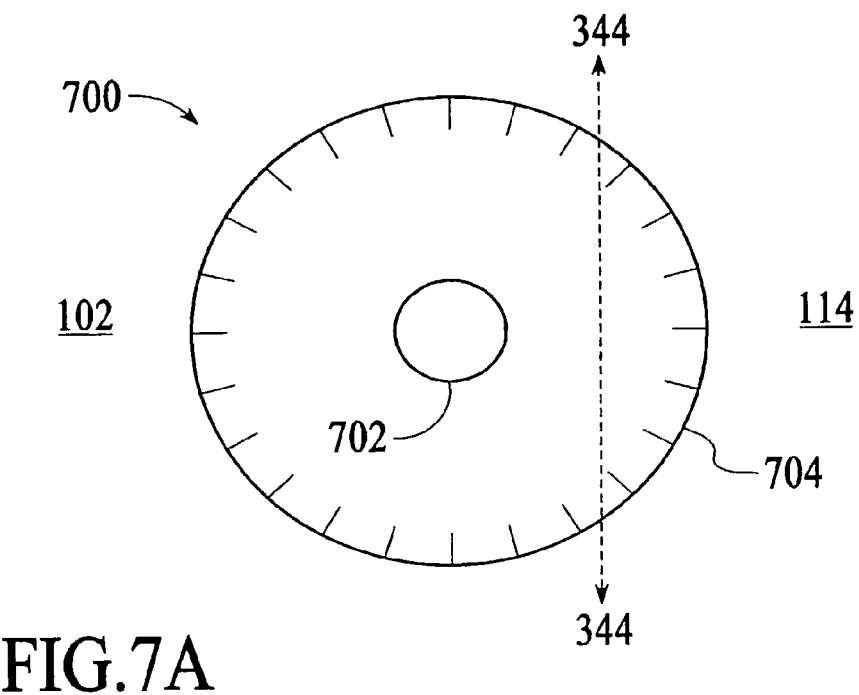
FIG. 7A is a top view of a non-electrical rotary dial in accordance with an embodiment of the invention.
Figure 7B:
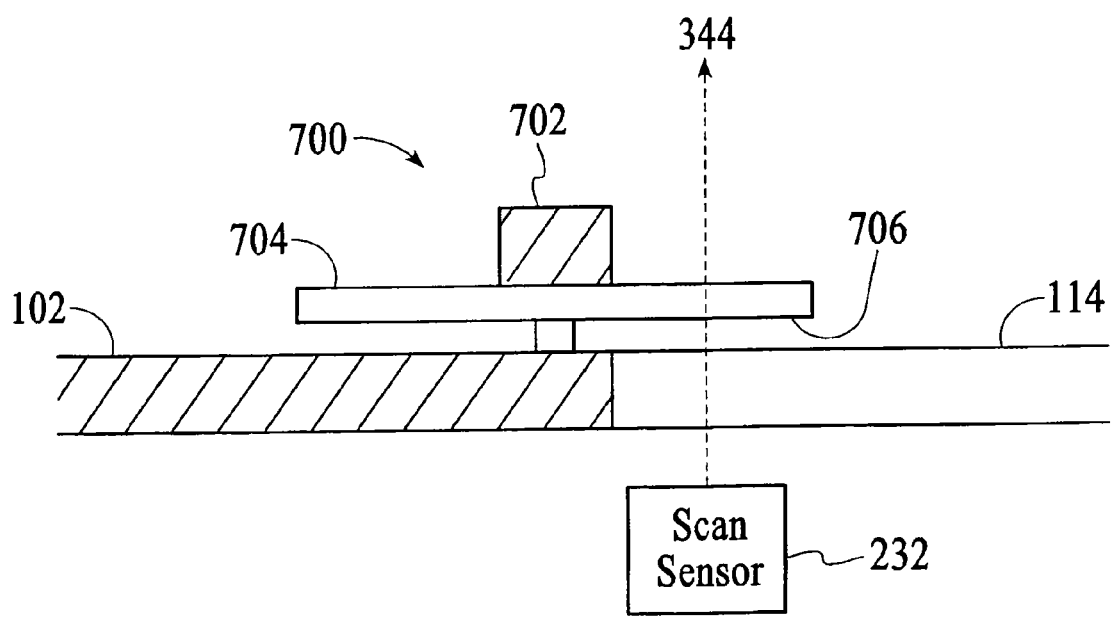
FIG. 7B is a cross-sectional side view of the non-electrical rotary dial of FIG. 7.

Turning now to FIGS. 7A and 7B, a non-electrical rotary dial 700 in accordance with an embodiment of the invention is shown. FIG. 7A is a top view of the rotary dial 700, while FIG. 7B is a cross-sectional side view of the rotary dial. The rotary dial 700 includes a knob 702 and a circular disk 704. The knob 702 is attached to the circular disk 704 at the central region of the disk so that the circular disk is rotated when the knob is manually rotated. The rotary dial 700 is positioned such that a portion of the circular disk 704 is located over the control scan line 344, as shown in FIG. 7A. The circular disk 704 of the rotary dial 700 includes a target undersurface 706, which can be imaged to determine the current setting of the rotary dial. The undersurface 706 of the circular disk 704 is encoded using a visual pattern that varies at different locations on the undersurface so that the current setting, i.e., rotational position of the rotary dial 700, can be determined by examining a particular portion of the visual pattern over a fixed position. Thus, the current setting of the rotary dial 700 can be determined by activating the scan sensor 232 to capture an image of a portion of the undersurface 706 of the rotary dial 700 along the control scan position 344, which is transmitted to and processed by the controller 230 to determine the current rotational position of the rotary dial using the visual pattern on the undersurface of the rotary dial. The rotational position of the rotary dial 700 is then used to determine the current setting of the rotary dial.

In other embodiments, the AIO device 100 may include other types of non-electrical control devices, each being configured to displace a target undersurface, which can be imaged to determine the current setting of that non-electrical control device.

The operation of the non-electrical control devices 116 of the AIO device 100 in accordance with an embodiment of the invention is now described. When the AIO device 100 is not actively performing a scanning process, the scan sensor 232 is parked below the user interface region 110 such that the scan line of the scan sensor is aligned with the control scan line 344. At this parked position, the scan sensor 232 is activated to capture an image, i.e., image data, along the control scan line 344. In an embodiment, the light source 340 of the scan sensor 232 is used to provide illumination for capturing the image. As an example, if the light source 340 of the scan sensor 232 is a fluorescent lamp, then the fluorescent lamp is turned on to capture the image. As another example, if the light source 340 of the scan sensor 232 is an array of R, B and G LEDs, all the LEDs of the array are turned on to capture the image. In an alternative embodiment, only LEDs of a particular color may be used to provide illumination for capturing the image. As an example, the particular color LEDs to be used for illumination may be chosen based on the material color of the target undersurfaces the non-electrical control devices 116 that will produce the best contrast. As another example, only blue LEDs may be used to capture the image since blue light is least sensitive to the eyes. The underlying rationale is that the light output of the LEDs that are used to capture images of the non-electrical control devices 116 will be significantly degraded due to continual use, and thus, the LEDs that provide the least visual information for the scanning process, i.e., the blue LEDs, are sacrificed. In still another embodiment, an additional light source (not shown) on the scan sensor 232 or on another part of the AIO device 100 may be used to provide illumination for capturing the image of the non-electrical control devices 116. The additional light source may be any type of a light source, such as a fluorescent lamp or an array of LEDs.

In an embodiment, the resolution of the image captured by the scan sensor 232 along the control scan line 344 can be a standard setting resolution. However, in other embodiments, the resolution of the image captured by the scan sensor 232 along the control scan line 344 can be lower than the standard setting resolution since clarity of the image may not be critical in determining the current settings of the non-electrical control devices 116. Furthermore, in some embodiments, the image captured by the scan sensor 232 along the control scan line 344 can be a grayscale image. However, if color is used as a distinguishing visual feature for a particular setting of a non-electrical control device, e.g., a rotary dial, then the image captured by the scan sensor 232 along the control scan line 344 can be a color image.

Next, the image in the form of image data captured by the scan sensor 232 at the control scan line 344 is transmitted to the controller 230 from the scan sensor 230. The image data is then processed by the controller 230 to determine the current settings of the non-electrical control devices 116. For the non-electrical button 116A, which is similar to the button 400 of FIGS. 4A and 4B, the controller 230 processes the image data to determine if the target undersurface of the button 116A is present or not in the captured image, which indicates whether the extendable member of the button 116A is extended. If the extendable member of the button 116A has not been extended, then the button is in the first setting. Conversely, if the extendable member of the button 116A has been extended, then the button is in the second setting. For the non-electrical switch 116B, which is similar to the dome-type switch 500 of FIGS. 5A and 5B, the controller 230 processes the image to determine if the target undersurface of the switch 116B is present or not in the captured image, which indicates whether the target undersurface has been moved downward. If the target undersurface of the switch 116B has not been moved downward, then the switch is in the first setting. Conversely, if the target undersurface of the switch 116B has been moved downward, then the switch is in the second setting. For each of the non-electrical sliding selectors 116C, which is similar to the sliding selector 600 of FIGS. 6A and 6B, the controller 230 processes the image to determine where the sliding arm of the sliding selector 116C is positioned, which indicates the current selection or setting. For the non-electrical rotary dial 116D, which is similar to the rotary dial 700 of FIGS. 7A and 7B, the controller 230 processes the image to determine what portion of the target undersurface of the rotary dial 116D has been imaged, which indicates the rotational position of the rotary dial. The rotational position of the rotary dial 116D can then be used to determine the current setting of the rotary dial. After the current settings of the non-electrical control devices 116 have been determined, the controller 230 performs the necessary steps to effectuate the operations associated with these current settings.

Figure 8:
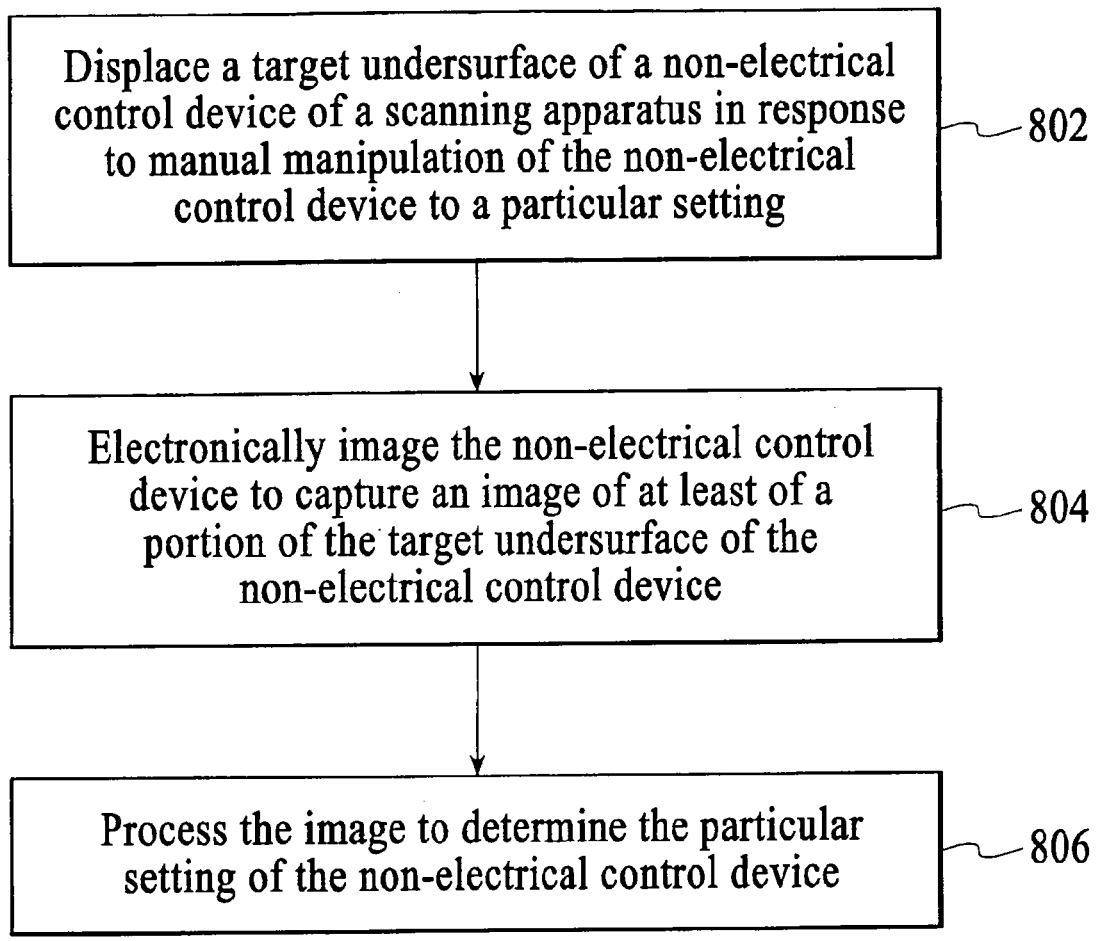
FIG. 8 is a flow diagram of a method for entering a user input into a scanning apparatus in accordance with an embodiment of the invention.

A method for entering a user input into a scanning apparatus in accordance with an embodiment of the invention is described with reference to a flow diagram of FIG. 8. At block 802, a target undersurface of a non-electrical control device of the scanning apparatus is displaced in response to manual manipulation of the non-electrical control device to a particular setting. Next, at block 804, the non-electrical control device is electronically imaged to capture an image of at least a portion of the target undersurface of the non-electrical control device. Next, at block 806, the image is processed to determine the particular setting of the non-electrical control device.

Although specific embodiments of the invention have been described and illustrated, the invention is not to be limited to the specific forms or arrangements of parts so described and illustrated. The scope of the invention is to be defined by the claims appended hereto and their equivalents.

We claim:
1. An apparatus comprising:
   a movable user input including a pattern on an undersurface;
   a scan sensor configured to capture image data of the undersurface; and
   a controller configured to process the captured image data of the undersurface to identify the pattern on the under- surface and determine a position of the movable user input based on the identified pattern.

2. The apparatus of claim 1, wherein the pattern is identified by examining a particular portion of the pattern over a fixed position.

3. The apparatus of claim 1, wherein the movable user input is a first movable user input, the apparatus further comprising:
a second movable user input aligned with the first movable user input along a control scan line.

4. The apparatus of claim 3, wherein the first movable user input is a rotary dial and the second movable user input is a sliding arm.

5. The apparatus of claim 1, wherein the controller is configured to align the scan sensor with a calibration strip located between the movable user input and a scanning region.

6. The apparatus of claim 1, further comprising:
a scanning region including a glass panel; and
a user interface region including the movable user input,
wherein the scan sensor is configured to operate in a first resolution in the scanning region and a second resolution in the user interface region, wherein the second resolution is lower than the first resolution.

7. The apparatus of claim 1, further comprising:
a scanning region including a glass panel and a user interface region including the movable user input,
wherein the scan sensor includes a plurality of light emitting diodes, and
wherein the scan sensor is configured to scan the scanning region using the plurality of light emitting diodes and configured to scan the user interface region using a subset of the plurality of light emitting diodes.

8. The apparatus of claim 1, wherein the movable user input is configured to move to a plurality of positions, each of the plurality of positions corresponding to a distinct pattern on the undersurface of the movable user input.

9. An apparatus comprising:
a non-electric control device configured to move to at least two different positions via a user's mechanical input;
a scan sensor configured to capture an image of at least a part of the non-electric control device; and
a controller configured to process the captured image of the at least a part of the non-electric control device to determine a specific mechanical user setting by correlating the image to a position of the non-electric control device.

10. The apparatus of claim 9, wherein the specific mechanical user setting is associated with a printing command selected from the group consisting of number of copies, type of image, start, or clear.

11. The apparatus of claim 9, wherein the non-electric control device includes a setting on a first side and one or more indicia on a second side.

12. The apparatus of claim 9, wherein the non-electric control device includes an extendable member movable to a first position and a second position, wherein the extendable member is detectable by the scan sensor at the first position, and wherein the extendable member is undetectable by the scan sensor at the second position.

13. The apparatus of claim 9, wherein the non-electric control device includes a dome type switch with a visual pattern detectable by the sensor to determine whether the dome-type switch is at a first setting or a second setting.

14. The apparatus of claim 9, wherein the non-electric control device includes a sliding arm arranged so that the sliding arm is laterally displaceable to a plurality of different positions corresponding to a plurality of different settings.

15. The apparatus of claim 9, wherein the non-electric control device is configured to move to a plurality of positions, each of the plurality of positions corresponding to a distinct pattern on at least a part of a respective non-electric control device.

16. A method comprising:
receiving a user input via a position of at least one control device, wherein the at least one control device includes a control device with a pattern on an undersurface of the control device;
obtaining an image of the pattern using a scan sensor;
processing the image to identify the pattern from a plurality of possible patterns; and
determining the position of the at least one control device based on the identified pattern.

17. The method of claim 16, further comprising
obtaining an object image through a glass plate using the scan sensor,
wherein the scan sensor is configured to operate in a first resolution when obtaining the object image and configured to operate in a second resolution when obtaining the image of the pattern, wherein the second resolution is lower than the first resolution.

18. The method of claim 16, further comprising:
obtaining an object image through a glass plate using the scan sensor, wherein the scan sensor includes a plurality of light emitting diodes, and wherein the scan sensor is configured to scan the object image using the plurality of light emitting diodes and configured to scan the image of the pattern using a subset of the plurality of light emitting diodes.

19. The method of claim 16, wherein the at least one control device includes:
an extendable member movable to a first position and a second position, wherein the extendable member is detectable by the scan sensor at the first position, and wherein the extendable member is undetectable by the scan sensor at the second position; and
a sliding arm arranged so that the sliding arm is laterally displaceable to a plurality of different positions corresponding to a plurality of different settings.

20. The method of claim 16, wherein the control device is configured to move to a plurality of positions, each of the plurality of positions corresponding to a distinct pattern on at least a part of the non-electric control device.

* * * * *